(12) United States Patent
Belling et al.

(10) Patent No.: US 10,425,863 B2
(45) Date of Patent: Sep. 24, 2019

(54) TRANSFER OF COMMUNICATION PARAMETERS

(71) Applicant: NOKIA SOLUTIONS AND NETWORKS OY, Espoo (FI)

(72) Inventors: Thomas Belling, Erding (DE); Peter Leis, Penzberg (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 15/517,765

(22) PCT Filed: Sep. 29, 2015

(86) PCT No.: PCT/EP2015/072443
§ 371 (c)(1),
(2) Date: Apr. 7, 2017

(87) PCT Pub. No.: WO2016/055308
PCT Pub. Date: Apr. 14, 2016

(65) Prior Publication Data
US 2017/0251408 A1  Aug. 31, 2017

Related U.S. Application Data

(60) Provisional application No. 62/061,366, filed on Oct. 8, 2014.

(51) Int. Cl.
*H04W 36/00* (2009.01)
*H04W 80/10* (2009.01)
*H04W 88/16* (2009.01)

(52) U.S. Cl.
CPC ... *H04W 36/0033* (2013.01); *H04W 36/0022* (2013.01); *H04W 80/10* (2013.01); *H04W 88/16* (2013.01)

(58) Field of Classification Search
CPC ......... H04W 36/0022; H04W 36/0033; H04W 80/10; H04W 88/16; H04W 76/10; H04W 76/16
See application file for complete search history.

(56) References Cited

U.S. PATENT DOCUMENTS

2012/0120914 A1* 5/2012 Sedlacek ............ H04W 60/005
370/331
2013/0084860 A1* 4/2013 Wong .................... H04W 60/00
455/435.1

(Continued)

FOREIGN PATENT DOCUMENTS

WO   WO 2013/156063 A1   10/2013
WO   WO 2015/062674 A1   5/2015

OTHER PUBLICATIONS

IQ.IP.com Patent/PG Pub search; dated May 3, 2019 (Year: 2019).*

(Continued)

*Primary Examiner* — Benjamin H Elliott, IV
(74) *Attorney, Agent, or Firm* — Squire Patton Boggs (US) LLP (57) ABSTRACT

Various communication systems may benefit from the transfer of sender or receiver communication parameters. For example, such transfer of sender communication parameters may be useful in connection with single radio voice call continuity (SRVCC) and reverse SRVCC. A method can include receiving, at an intermediate entity from a first entity, signaling including at least one parameter describing a user plane payload format that the first entity wants to receive and an encoding that the first entity wants to receive. The method can also include forwarding, by the intermediate entity, the at least one parameter in signaling to a second entity.

25 Claims, 5 Drawing Sheets

(56) References Cited

U.S. PATENT DOCUMENTS

| | | | |
|---|---|---|---|
| 2013/0170471 A1* | 7/2013 | Nix | H04W 36/00 370/331 |
| 2013/0242942 A1* | 9/2013 | Stille | H04L 65/1016 370/331 |
| 2013/0272194 A1* | 10/2013 | Keller | H04W 36/0022 370/328 |
| 2014/0099966 A1* | 4/2014 | Hori | H04W 76/22 455/450 |
| 2014/0328323 A1* | 11/2014 | Zhang | H04L 69/24 370/331 |
| 2015/0063299 A1* | 3/2015 | Keller | H04W 36/0022 370/331 |
| 2015/0131526 A1* | 5/2015 | Noldus | H04L 65/103 370/328 |
| 2015/0156677 A1* | 6/2015 | Vedrine | H04W 36/0022 370/331 |
| 2016/0157136 A1* | 6/2016 | Hori | H04W 76/22 370/331 |
| 2017/0019429 A1* | 1/2017 | Tu | H04W 36/0022 |
| 2017/0180429 A1* | 6/2017 | Osterlund | H04L 65/1006 |
| 2017/0251408 A1* | 8/2017 | Belling | H04W 36/0033 |

OTHER PUBLICATIONS

International Search Report and Written Opinion dated Dec. 15, 2015 corresponding to International Patent Application No. PCT/EP2015/072443.

Nokia Siemens Networks et al: "eMPS for SRVCC on IMS level," 3GPP Draft; S2-113539, 3GPP TSG-SA2 Meeting #86, Naantali, Finland, Jul. 11-15, 2011, Jul. 14, 2011, XP050548843.

3GPP TS 23.216 V12.1.0 (Jun. 2014), Technical Specification, 3rd Generation Partnership Project; Technical Specification Group Services and System Aspects; Single Radio Voice Call Continuity (SRVCC); Stage 2 (Release 12), Jun. 2014, 69 pages.

3GPP TS 23.237 V12.7.0 (Jun. 2014), Technical Specification, 3rd Generation Partnership Project; Technical Specification Group Services and System Aspects; IP Multimedia Subsystem (IMS) Service Continuity; Stage 2, (Release 12), Jun. 2014, 172 pages.

R. Troost et al., "Communicating Presentation Information in Internet Messages: The Content-Disposition Header Field," Network Working Group, RFC 2183, Aug. 1997, pp. 1-12.

J. Rosenberg et al., "An Offer/Answer Model with the Session Description Protocol (SDP)," Network Working Group, RFC 3264, Jun. 2002.

M. Handley et al., "SDP: Session Description Protocol," Network Working Group, RFC 4566, Jul. 2006.

J. Sjoberg et al., "RTP Payload Format and File Storage Format for the Adaptive Multi-Rate (AMR) and Adaptive Multi-Rate Wideband (AMR-WB) Audio Codecs," Network Working Group, RFC 4867, Apr. 2007.

Ericsson, "New WID for SRVCC Enhancements for Transcoding Avoidance," 3GPP Draft; TD SP-140436, 3GPP TSG SA Meeting #65, Edinburgh, Scotland, UK, Sep. 15-17, 2014.

Communication pursuant to Article 94(3) EPC dated Jul. 17, 2019 corresponding to European Patent Application No. 15774578.7.

* cited by examiner

*: Location of functionality depends on deployment and collocation scenario

**: Reference point dependent on MSC Server capability

TRANSFER OF COMMUNICATION PARAMETERS

CROSS-REFERENCE TO RELATED APPLICATION

This application is related to and claims the benefit and priority of U.S. Provisional Application No. 62/061,366, filed Oct. 8, 2014, the entirety of which is hereby incorporated herein by reference.

BACKGROUND

Field

Various communication systems may benefit from the transfer of sender or receiver communication parameters. For example, such transfer of sender communication parameters may be useful in connection with single radio voice call continuity (SRVCC) and reverse SRVCC.

Description of the Related Art

Third generation partnership project (3GPP) technical specification (TS) 23.216 and TS 23.237 describe the single radio voice call continuity (SRVCC) procedures that are already standardized in 3GPP. Each of 3GPP TS 23.216 and 3GPP TS 23.237 is hereby incorporated herein by reference in its entirety. Additional SRVCC procedures may be needed to enhance the chances of transcoder-free operation for voice calls after a handover from PS access for voice to CS voice access. Examples of PS access for voice include long term evolution (LTE), where internet protocol (IP) based voice over LTE (VoLTE) is used. Examples of CS voice access include global system for mobile communication (GSM) and universal mobile telecommunications system (UMTS).

An access transfer control function (ATCF) and an access transfer gateway (ATGW) can be used to anchor media. They can be inserted into the session initiation protocol (SIP) signaling and media path, respectively, to avoid the remote peer needing, during a handover, to be updated to inform it about a change of the termination of the IP part of the media path from user equipment (UE) to mobile switching center (MSC) server during a handover.

After a handover, the ATGW may need to modify the transport format and possibly also encoding of user plane packets received from the remote peer even if the codec is not changed. This modification may be needed to adjust to the formats the MSC wants to receive. For instance, the ATGW may need to adjust the real time protocol (RTP) payload type or modify the number of speech samples in a packet.

This need for modification or adjustment may be caused by the fact that, prior to the handover, in session description protocol (SDP) the UE has signaled payload and encoding parameters describing the payload and encoding the UE wants to receive. This information has been forwarded to the remote peer, which has chosen the transport format and encoding the remote peer uses when sending packets accordingly. However, the MSC is not aware which transport formats and encoding parameters the UE has signaled. The MSC may choose different parameters, even if it could also support receiving the transport format end encoding the UE has signaled. To avoid long service interruption during the handover, the remote peer may not be informed via new SDP signaling during the handover about the transport format end encoding parameters the MSC desires to receive.

Conventionally, one option is that the ATCF can update the remote peer via SDP signaling with the transport and encoding parameters provided by the MSC. However, the related SDP offer-answer exchange may take several seconds to complete. During this time, either extra resources at the ATGW are still required as the ATGW still needs to be prepared to receive the payload format as originally requested by the UE, and change the format and encoding to what has been requested by the MSC, as well as the new payload format end encoding requested by the MSC. Otherwise there will be a service interruption.

SUMMARY

According to a first embodiment, a method can include receiving, at an intermediate entity from a first entity, signaling including at least one parameter describing a user plane payload format that the first entity wants to receive and an encoding that the first entity wants to receive. The method can also include forwarding, by the intermediate entity, the at least one parameter in signaling to a second entity. The method can also include signaling, by the intermediate entity when media no longer needs to be sent towards the first entity but towards a third entity, the at least one parameter to the third entity.

In a variant, the signaling can be responsive to a request received from the third entity.

In a variant, the signaling can be sent during a handover.

In a variant, the third entity can be a mobile switching center.

In a variant, the method can further include receiving, at the intermediate entity from the third entity, at least one second parameter describing the format and encoding the third entity has selected to receive the user plane. The method can additionally include comparing the at least one second parameter with the at least one parameter. The method can also include configuring, when the at least one second parameter differs from the at least one parameter, a media gateway to modify user plane packets received from the second entity to a transport format and encoding the third entity wants to receive and then forward the packets to the third entity.

In a variant, the media gateway can be a media gateway controlled by or incorporated in the intermediate entity.

In a variant, the first entity can be a user equipment or mobile switching center.

In a variant, the intermediate entity can be an access transfer control function.

In a variant, the second entity can be a remote peer of the first entity.

In a variant, the method can further include, if the third entity also needs to send media, or other user plane data, towards the second entity, signaling the at least one parameter to the third entity in a same message that also describes what the second entity requests to receive.

In a variant, the method can further include, marking parameters relating to what the first entity requests to receive, to keep them apart from parameters describing what the second entity wants to receive.

In a variant, the marking can include encapsulating the parameters relating to the first entity in a new SDP attribute and/or including the parameters relating to the first entity in a separate SDP body, which can be encapsulated in the SIP message.

According to a second embodiment, a method can include receiving, at a third entity from an intermediate entity when media no longer needs to be sent towards a first entity but towards the third entity, at least one parameter. The at least one parameter can describe a user plane payload format that the first entity wants to receive and an encoding that the first entity wants to receive. The method can also include using the at least one parameter to select the payload format and encoding the third entity will use to receive user plane packets.

In a variant, selecting the payload format and encoding can include comparing the third entity's own receiving and decoding capabilities with the at least one parameter.

In a variant, the selecting can include selecting the format and encoding according to the at least one parameter, when the third entity supports the format and encoding according to the at least one parameter.

In a variant, the method can also include requesting, by the third entity, the at least one parameters when the third entity detects that a handover has to be started, wherein the receiving is responsive to the request.

In a variant, the method can further include signaling, by the third entity to the intermediate entity, at least one second parameter describing the format and encoding the third entity has selected to receive the user plane.

According to third and fourth embodiments, an apparatus can include means for performing the method respectively according to the first and second embodiments.

According to fifth and sixth embodiments, an apparatus can include at least one processor and at least one memory including computer program code. The at least one memory and the computer program code are configured to, with the at least one processor, cause the apparatus at least to perform the method respectively according to the first and second embodiments.

According to seventh and eighth embodiments, a computer program product can encode instructions for performing a process. The process can include the method respectively according to the first and second embodiments.

According to ninth and tenth embodiments, a non-transitory computer readable medium can be encoded with instructions that, when executed in hardware, perform a process. The process can include the method respectively according to the first and second embodiments.

BRIEF DESCRIPTION OF THE DRAWINGS

For proper understanding of the invention, reference should be made to the accompanying drawings, wherein.

DETAILED DESCRIPTION

In certain embodiments, an intermediate network entity, for example an ATCF, may receive from a first entity, for example UE, signaling including parameter(s) describing the user plane payload format and encoding the first entity wants to receive.

The intermediate network entity can forward those parameter(s) in signaling to a second entity, for example a remote peer of the first entity. The second entity can then send user plane packets with payload format and encoding according to those parameters to the first entity.

When those media no longer need to be sent towards the first entity, but towards a third entity, for example during a handover, the intermediate entity can signal those parameters to the third entity. The third entity may be, for example, an MSC. The third entity can use those parameters to select the payload format and encoding the third entity will use to receive user plane packets.

Thus, in certain embodiments, the third entity can do the selection by comparing the third entity's own receiving and decoding capabilities with those parameters describing payload format and encoding of the existing session, and can select the format and encoding according to those parameters, if the third entity supports such format and encoding.

The third entity may request to obtain those parameters when, for example, the third entity detects that a handover has to be started. The request can be sent in various ways. The third entity has a variety of options to obtain the parameters describing payload format and encoding from the intermediate entity.

For example, the third party can send an offerless INVITE, and can subsequently receive the parameters in a SDP offer contained in a SIP response from the intermediate entity. Alternatively, the third party can, prior to sending the session transfer INVITE, send a SIP OPTIONS request to the intermediate entity. The intermediate entity can provide the information in a SDP body contained in 200 (OK).

The third entity can then signal parameters describing the format and encoding the third entity has selected to receive the user plane to the intermediate network entity. The intermediate entity can compare the parameters received from the third entity with the parameters the intermediate entity had previously sent to the third entity. If the parameters differ, the intermediate entity can configure a media gateway the intermediate entity controls or incorporates to modify user plane packets received from the second entity, to the transport format and encoding the third entity wants to receive and then forward those packets to the third entity.

A variety of parameters can be used to describe the user plane payload format and encoding the first entity requests to receive. For example, the entities can use the SDP "payload type number", "ptime" and "bandwidth attribute", as defined in IETF 4566, and used according to RFC 3264. Also, or alternatively, the entities can use the "maxptime", "mode-change-neighbor", "mode-change-period" and "mode-change-capability" parameters defined for the AMR and WB-AMR codecs in RFC 4867. Each of IETF 4566, RFC 3264, and RFC 4867 is hereby incorporated herein by reference in its entirety. These or other parameters can be included in an SDP body within a SIP message.

If the third entity also needs to send media, or other user plane data, towards the second entity, for example for a bidirectional speech communication, an interworking entity can signal those parameters to the third entity in the same message that also describes what the second entity requests to receive. The SDP description of what the second entity wants to receive can also use SDP and possibly the same parameters. The parameters relating to what the first entity requests to receive are marked, to keep them apart from the parameters describing what the second entity wants to receive, which are encoded according to existing SDP rules.

The marking of the parameters relating to the first entity can be done in a variety of ways. For example, the parameters relating to the first entity can be encapsulated in a new SDP attribute. Also, or alternatively, the parameters relating to the first entity can be included in a separate SDP body, which can be marked with a suitable "content type" or with a suitable "content-disposition" value (see IETF RFC 2183), and which can be encapsulated in the SIP message.

Certain embodiments may be applicable to the single radio voice call continuity (SRVCC) procedures in 3GPP. In such a case, the first entity can be the served UE and the second entity can be the remote peer, which may also be a UE. Furthermore, the third entity can then be an MSC, the intermediate or interworking entity can be the ATCF, while the interworking gateway can be the ATGW.

Certain embodiments may also be applicable to the reverse SRVCC procedures in 3GPP, such as a handover from CS voice access to PS voice access. In such a case, the first entity can be the MSC, while the second entity can be the remote peer, such as a UE. The third entity can then be the served UE, with the interworking entity being the ATCF, and the interworking gateway being the ATGW.

Certain embodiments may also be applicable for the handover of video calls. Furthermore, certain embodiments can apply to call transfer procedures.

Figure 1:
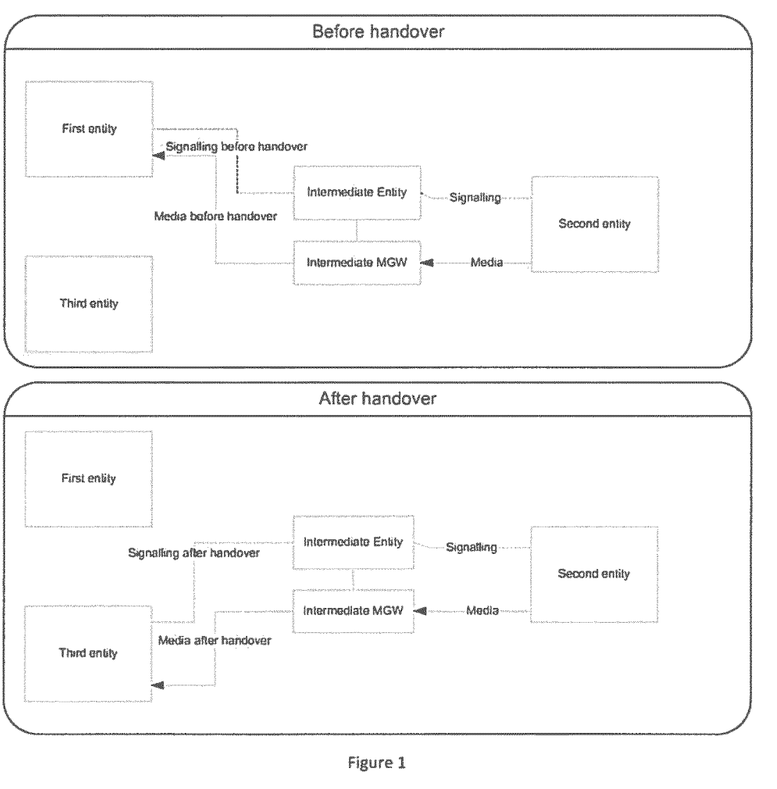
FIG. 1 illustrates an architectural reference model, according to certain embodiments.

FIG. 1 illustrates an architectural reference model, according to certain embodiments. The intermediate entity and the intermediate MGW may be combined in one entity. As shown in FIG. 1, before a handover signaling can flow between a first entity and a second entity via an intermediate entity, while media can flow from the second entity to the first entity via an intermediate gateway. Then, after handover, the third entity can essentially be substituted for the first entity. As noted above, various network elements can correspond to the illustrated first, second, and third entities.

Figure 2:
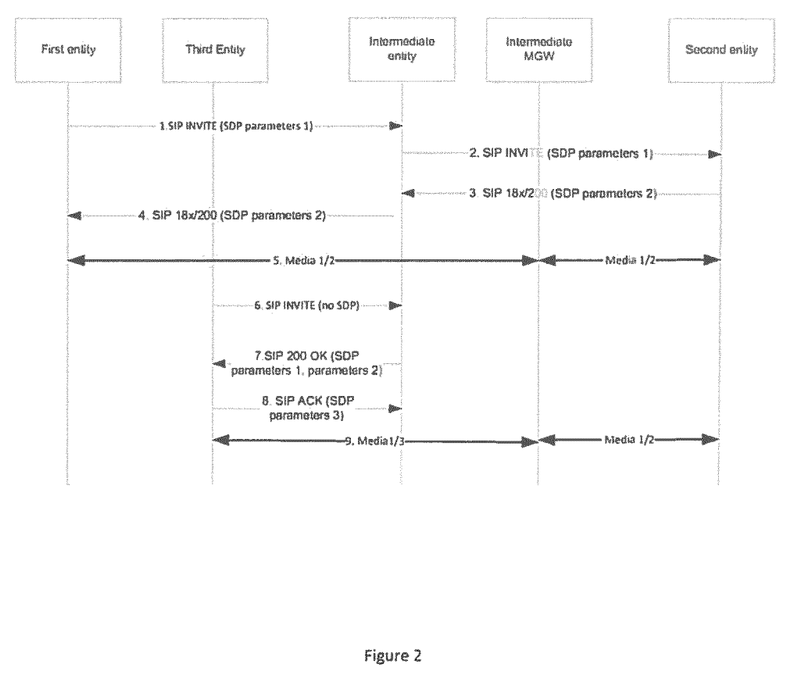
FIG. 2 illustrates an example signaling flow, according to certain embodiments.

FIG. 2 illustrates an example signaling flow, according to certain embodiments. As shown in FIG. 2, at 1, the first entity can send a SIP INVITE with an SDP offer. Within the SDP offer, parameters 1 can describe, for one or several media streams, the payload format and encoding the first entity requests to receive, such as, for example, the RTP payload type, packetization time and bandwidth.

At 2, the intermediate entity can forward the SIP INVITE including parameters 1. Furthermore, at 3 the second entity can reply with a SIP response that includes an SDP answer that contains parameters 2 that describe for one or several media streams the payload format and encoding the second entity requests to receive. Then, at 4, the intermediate entity can forward the SIP response including parameters 2.

Then, at 5, media can be exchanged between the first entity and second entity. The media can be transferred via an intermediate MGW controlled by the intermediate entity. Media in the direction towards the first entity can be encoded in accordance with parameters 1. Media in the direction towards the first entity can be encoded in accordance with parameters 2.

At 6, media may need to be exchanged between the third and the second entity. This need may arise, for example, because of a handover. The second entity can send an offer-less SIP INVITE to start a handover procedure.

Then, at 7, the interworking unit can send a SIP 200 OK(INVITE) that includes SDP with parameters 2 in an existing encoding that describe the payload format and encoding the second entity has requested to receive. The interworking unit can also include in a new encoding, which may, for example, be encoded as a new SDP attribute or as a new MIME body within the SIP message, the parameters 1, that describe the payload format and encoding the first entity has requested to receive.

The third entity can use parameters 1 to select the payload format and encoding it will request to receive. If the third entity supports the payload format and encoding according to parameters 1, the third entity can select that payload format and encoding.

At 8, the third entity can reply with a SIP ACK that includes an SDP answer that contains parameters 3, which describe, for one or several media streams, the payload format and encoding the third entity requests to receive. Media can then, at 9, be exchanged between the third entity and second entity. The media can be transferred via the intermediate MGW controlled by the intermediate entity. Media in the direction towards the second entity can be encoded in accordance with parameters 2. Media in the direction towards the third entity can be encoded in accordance with parameters 3 between the third entity and the intermediate MGW, and in accordance with parameters 1 between the intermediate MGW and the second entity. If parameters 1 and 3 do not differ, the MGW may not need to modify the payload format and encoding when forwarding the media.

Figure 3:
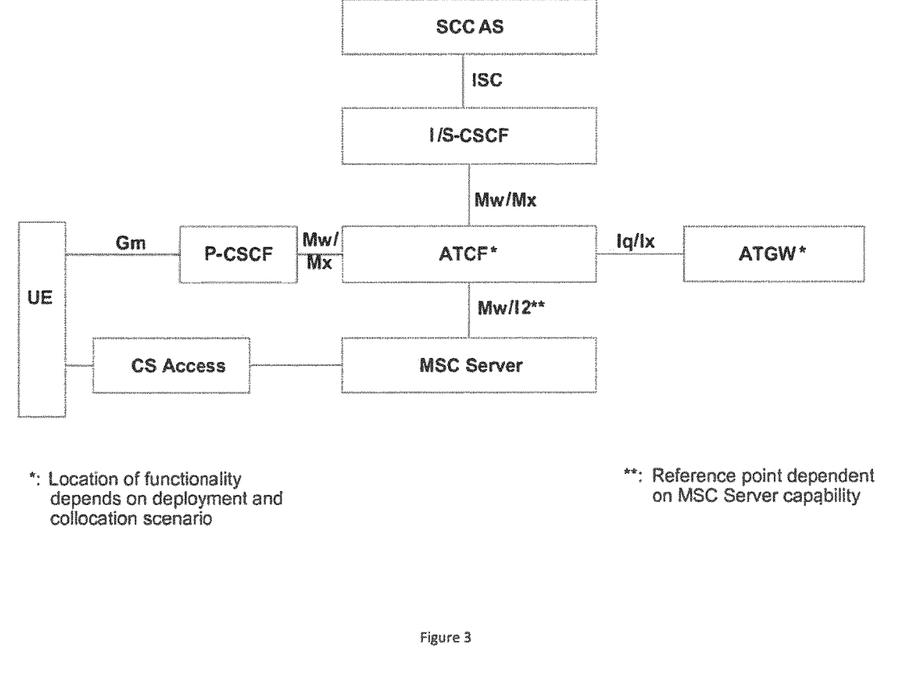
FIG. 3 presents an architectural reference model for SRVCC.

FIG. 3 presents an architectural reference model for SRVCC. FIG. 3 illustrates the model depicted in 3GPP TS 23.237. As mentioned above, for SRVCC, the first entity can be the UE, the second entity can be the remote peer (not shown), the third entity can be the MSC Server, the intermediate entity can be the ATCF, and the intermediate MGW can be the ATGW. Likewise, for reverse SRVCC, the first entity can be the MSC server, the second entity can be the remote peer (not shown), the third entity can be the UE, the intermediate entity can be the ATCF, and the intermediate MGW can be the ATGW.

Figure 4:
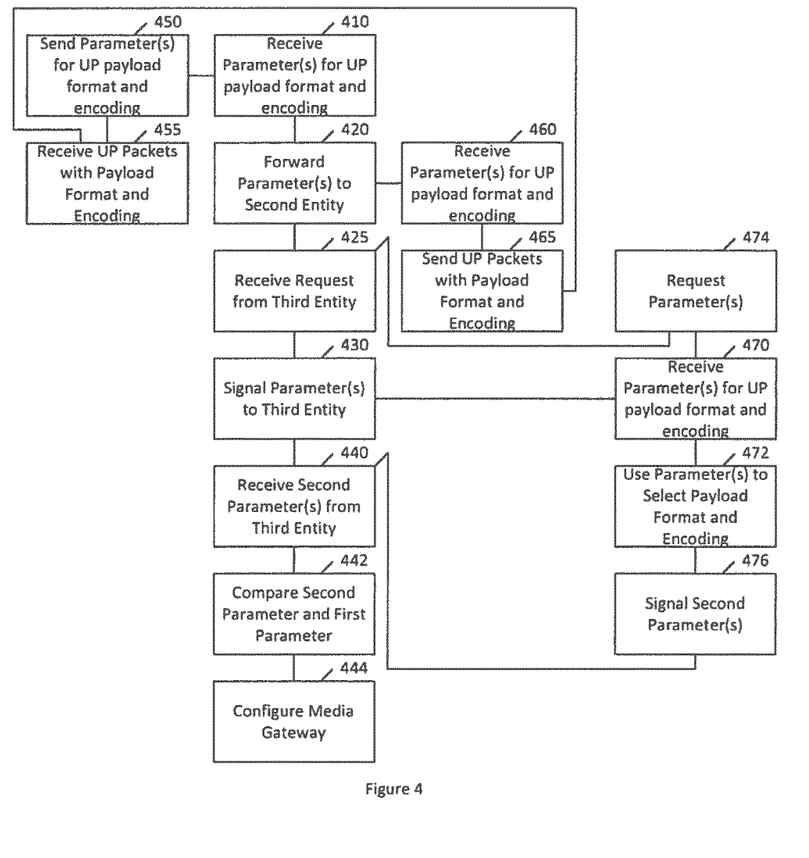
FIG. 4 illustrates a method according to certain embodiments.

FIG. 4 illustrates a method according to certain embodiments. As shown in FIG. 4, at 410 a method can include receiving, at an intermediate entity from a first entity, signaling including at least one parameter describing a user plane payload format that the first entity wants to receive and an encoding that the first entity wants to receive. The first entity can be a user equipment or mobile switching center. The intermediate entity can be an access transfer control function.

The method can also include, at 420, forwarding, by the intermediate entity, the at least one parameter in signaling to a second entity. The second entity can be a remote peer of the first entity.

The method can also include, at 430, signaling, by the intermediate entity when media no longer needs to be sent towards the first entity but towards a third entity, the at least one parameter to the third entity. For example, the signaling can be sent during a handover. The signaling can responsive to a request received from the third entity at 425. The third entity can be a mobile switching center.

The method can further include, at 440, receiving, at the intermediate entity from the third entity, at least one second parameter describing the format and encoding the third entity has selected to receive the user plane. The method can also include, at 442, comparing the at least one second parameter with the at least one parameter. The method can additionally include, at 444, configuring, when the at least one second parameter differs from the at least one parameter, a media gateway to modify user plane packets received from the second entity to a transport format and encoding the third entity wants to receive and then forward the packets to the third entity. The media gateway can be a media gateway controlled by or incorporated in the intermediate entity.

The method can also include, at 450, sending, to the intermediate entity from the first entity, signaling including the at least one parameter describing the user plane payload format that the first entity wants to receive and the encoding that the first entity wants to receive. The method can also include, at 455, receiving, from the second entity at the first entity, user plane packets with payload format and encoding according to the at least one parameter.

The method can also include, at 460, receiving, at the second entity by the intermediate entity, at least one parameter in signaling, wherein the parameter describes the user plane payload format that the first entity wants to receive and the encoding that the first entity wants to receive. The method can also include, at 465, sending, by the second entity to the first entity, user plane packets with payload format and encoding according to the at least one parameter.

The method additionally include, at 470, receiving, at the third entity from the intermediate entity when media no longer needs to be sent towards the first entity but towards the third entity, the at least one parameter. The method can also include, at 472, using the parameter to select the payload format and encoding the third entity will use to receive user plane packets. Selecting can include comparing the third entity's own receiving and decoding capabilities with the at least one parameter. The selecting can include selecting the format and encoding according to the at least one parameter, when the third entity supports the format and encoding according to the at least one parameter.

The method can also include, at 474, requesting, by the third entity, the at least one parameters when the third entity detects that a handover has to be started, wherein the receiving is responsive to the request.

The method can further include, at 476, signaling, by the third entity to the intermediate entity, at least one second parameter describing the format and encoding the third entity has selected to receive the user plane.

Figure 5:
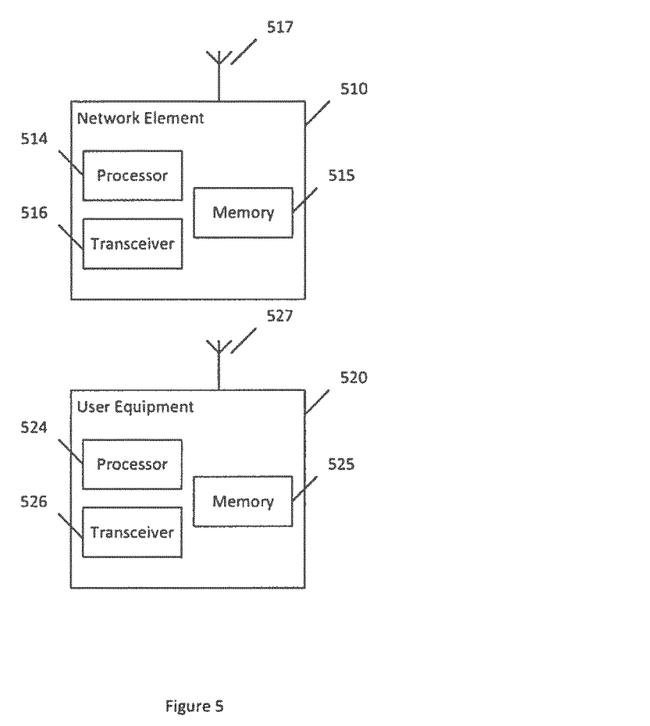
FIG. 5 illustrates a system according to certain embodiments.

FIG. 5 illustrates a system according to certain embodiments of the invention. It should be understood that each block of the flowchart of FIG. 4 may be implemented by various means or their combinations, such as hardware, software, firmware, one or more processors and/or circuitry. In one embodiment, a system may include several devices, such as, for example, network element 510 and user equipment (UE) or user device 520. The system may include more than one UE 520 and more than one network element 510, although only one of each is shown for the purposes of illustration. A network element can be an access point, a base station, an eNode B (eNB), MSC, ATCF, MGW, or any other network element, such as those shown or described in reference to FIGS. 1-3. Each of these devices may include at least one processor or control unit or module, respectively indicated as 514 and 524. At least one memory may be provided in each device, and indicated as 515 and 525, respectively. The memory may include computer program instructions or computer code contained therein. One or more transceiver 516 and 526 may be provided, and each device may also include an antenna, respectively illustrated as 517 and 527. Although only one antenna each is shown, many antennas and multiple antenna elements may be provided to each of the devices. Other configurations of these devices, for example, may be provided. For example, network element 510 and UE 520 may be additionally configured for wired communication, in addition to wireless communication, and in such a case antennas 517 and 527 may illustrate any form of communication hardware, without being limited to merely an antenna. In the case of such network elements as MGW and ATCF, the device may be configured solely for wired communication.

Transceivers 516 and 526 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. It should also be appreciated that according to the "liquid" or flexible radio concept, the operations and functionalities may be performed in different entities, such as nodes, hosts or servers, in a flexible manner. In other words, division of labor may vary case by case. One possible use is to make a network element to deliver local content. One or more functionalities may also be implemented as a virtual application that is as software that can run on a server.

A user device or user equipment 520 may be a mobile station (MS) such as a mobile phone or smart phone or multimedia device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof. The user device or user equipment 520 may be a sensor or smart meter, or other device that may usually be configured for a single location.

In an exemplifying embodiment, an apparatus, such as a node or user device, may include means for carrying out embodiments described above in relation to FIG. 4.

Processors 514 and 524 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors. Additionally, the processors may be implemented as a pool of processors in a local configuration, in a cloud configuration, or in a combination thereof.

For firmware or software, the implementation may include modules or unit of at least one chip set (e.g., procedures, functions, and so on). Memories 515 and 525 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network element 510 and/or UE 520, to perform any of the processes described above (see, for example, either of FIG. 2 or 4). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments of the invention may be performed entirely in hardware.

Furthermore, although FIG. 5 illustrates a system including a network element 510 and a UE 520, embodiments of the invention may be applicable to other configurations, and configurations involving additional elements, as illustrated and discussed herein. For example, multiple user equipment devices and multiple network elements may be present (see, for example, FIGS. 1-3), or other nodes providing similar functionality, such as nodes that combine the functionality of a user equipment and an access point, such as a relay node.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

LIST OF ABBREVIATIONS

AMR Adaptive Multi-Rate
ATCF Access Transfer Control Function
ATGW Access Transfer Gateway
IMS Internet Multimedia Subsystem
MSC Mobile Switching Centre
CSCF Call Session Control Function
P-CSCF Proxy CSCF
S-CSCF Serving CSCF
AS Application Server
SDP Session Description Protocol
SIP Session Initiation Protocol
SRVCC Single Radio Voice Call Continuity
STN-SR Session Transfer Number for SR-VCC
UE User Equipment

We claim:

1. A method, comprising:
receiving, at an access transfer control function from a user equipment, signaling including at least one parameter describing a user plane payload format that the user equipment wants to receive and an encoding that the user equipment wants to receive;
forwarding, by the access transfer control function, the at least one parameter in signaling to a remote peer of the user equipment;
receiving, at the access transfer control function from a mobile switching center, at least one second parameter describing the format and encoding the mobile switching center has selected to receive the user plane;
comparing the at least one second parameter with the at least one parameter;
configuring, when the at least one second parameter differs from the at least one parameter, a media gateway to modify user plane packets received from the remote peer of the user equipment to a transport format and encoding the mobile switching center wants to receive and then forward the packets to the mobile switching center; and
signaling, by the access transfer control function when media no longer needs to be sent towards the user equipment but towards the mobile switching center, the at least one parameter to the mobile switching center.

2. The method of claim 1, wherein the signaling the at least one parameter to the mobile switching center is responsive to a request received from the mobile switching center.

3. The method of claim 1, wherein the signaling the at least one parameter to the mobile switching center is sent during a handover.

4. The method of claim 1, wherein the media gateway is controlled by or incorporated in the access transfer control function.

5. The method of claim 1, wherein the user equipment comprises a user equipment or mobile switching center.

6. The method of claim 1, further comprising:
signaling the at least one parameter to the mobile switching center in a same message that also describes what the remote peer of the user equipment requests to receive when the mobile switching center also needs to send media, or other user plane data, towards the remote peer of the user equipment.

7. The method of claim 1, further comprising:
marking parameters relating to what the user equipment requests to receive, to keep them apart from parameters describing what the remote peer of the user equipment wants to receive.

8. The method of claim 7, wherein the marking can include encapsulating the parameters relating to the user equipment in a new SDP attribute and/or including the parameters relating to the user equipment in a separate SDP body, which can be encapsulated in the SIP message.

9. A method, comprising:
signaling, by a mobile switching center to an access transfer control function, at least one first parameter describing a format and an encoding that the mobile switching center has selected to receive the user plane, wherein the at least one first parameter is configured to be compared with at least one second parameter and, when the at least one first parameter differs from the at least one second parameter, used to configure a media gateway to modify user plane packets received from a remote peer of a user equipment to a transport format and encoding the mobile switching center wants to receive and then forward the packets to the mobile switching center;
receiving, at the mobile switching center from the access transfer control function when media no longer needs to be sent towards the user equipment but towards the mobile switching center, the at least one second parameter, wherein the at least one second parameter is configured to describe a user plane payload format that the user equipment wants to receive and an encoding that the user equipment wants to receive; and
using the at least one second parameter to select the payload format and encoding the mobile switching center will use to receive user plane packets.

10. The method of claim 9, wherein selecting the payload format and encoding comprises comparing the mobile switching center's own receiving and decoding capabilities with the at least one parameter.

11. The method of claim 9, wherein the selecting comprises selecting the format and encoding according to the at least one parameter, when the mobile switching center supports the format and encoding according to the at least one parameter.

12. The method of claim 9, further comprising:
requesting, by the mobile switching center, the at least one parameters when the mobile switching center detects that a handover has to be started, wherein the receiving is responsive to the request.

13. The method of claim 9, further comprising:
signaling, by the mobile switching center to the access transfer control function, at least one second parameter describing the format and encoding the mobile switching center has selected to receive the user plane.

14. An apparatus, comprising:
at least one processor; and
at least one memory including computer program code,
wherein the at least one memory and the computer program code are configured to, with the at least one processor, cause the apparatus at least to:
receive, from a user equipment, signaling including at least one parameter describing a user plane payload format that the user equipment wants to receive and an encoding that the user equipment wants to receive;
forward the at least one parameter in signaling to a remote peer of the user equipment;
receive, from a mobile switching center, at least one second parameter describing the format and encoding the mobile switching center has selected to receive the user plane;
compare the at least one second parameter with the at least one parameter;
configure, when the at least one second parameter differs from the at least one parameter, a media gateway to modify user plane packets received from the remote peer of the user equipment to a transport format and encoding the mobile switching center wants to receive and then forward the packets to the mobile switching center; and
signal, when media no longer needs to be sent towards the user equipment but towards the mobile switching center, the at least one parameter to the mobile switching center.

15. The apparatus of claim 14, wherein the at least one memory and the computer program code are configured to, with the at least one processor, cause the apparatus at least to signal the at least one parameter responsive to a request received from the mobile switching center.

16. The apparatus of claim 14, wherein the at least one memory and the computer program code are configured to, with the at least one processor, cause the apparatus at least to signal the at least one parameter during a handover.

17. The apparatus of claim 14, wherein the media gateway comprises a media gateway controlled by or incorporated in the access transfer control function.

18. The apparatus of claim 14, wherein the user equipment comprises a user equipment or mobile switching center.

19. The apparatus of claim 14, wherein the at least one memory and the computer program code are configured to, with the at least one processor, cause the apparatus at least to signal the at least one parameter to the mobile switching center in a same message that also describes what the remote peer of the user equipment requests to receive when the mobile switching center also needs to send media, or other user plane data, towards the remote peer of the user equipment.

20. The apparatus of claim 14, wherein the at least one memory and the computer program code are configured to, with the at least one processor, cause the apparatus at least to mark parameters relating to what the user equipment requests to receive, to keep them apart from parameters describing what the remote peer of the user equipment wants to receive.

21. The apparatus of claim 20, wherein the at least one memory and the computer program code are configured to, with the at least one processor, cause the apparatus at least to mark parameters by at least encapsulating the parameters relating to the user equipment in a new SDP attribute and/or including the parameters relating to the user equipment in a separate SDP body, which can be encapsulated in the SIP message.

22. An apparatus, comprising:
at least one processor; and
at least one memory including computer program code,
wherein the at least one memory and the computer program code are configured to, with the at least one processor, cause the apparatus at least to:
signal, to an access transfer control function, at least one first parameter describing a format and an encoding that the apparatus has selected to receive the user plane, wherein the at least one first parameter is configured to be compared with at least one second parameter, when the at least one first parameter differs from the at least one second parameter, and used to configure a media gateway to modify user plane packets received from a remote peer of a user equipment to a transport format and encoding the apparatus wants to receive and forward the packets to the apparatus;
receive, from an access transfer control function when media no longer needs to be sent towards the user equipment but towards the apparatus, at least one parameter, wherein the at least one parameter is configured to describe a user plane payload format that the user equipment wants to receive and an encoding that the user equipment wants to receive; and
use the at least one parameter to select the payload format and encoding the apparatus will use to receive user plane packets.

23. The apparatus of claim 22, wherein the at least one memory and the computer program code are configured to, with the at least one processor, cause the apparatus at least to, in selecting the payload format and encoding, compare the mobile switching center's own receiving and decoding capabilities with the at least one parameter.

24. The apparatus of claim 22, wherein the at least one memory and the computer program code are configured to, with the at least one processor, cause the apparatus at least to select the format and encoding according to the at least one parameter, when the mobile switching center supports the format and encoding according to the at least one parameter.

25. The apparatus of claim 22, wherein the at least one memory and the computer program code are configured to, with the at least one processor, cause the apparatus at least to request the at least one parameters when the apparatus detects that a handover has to be started, wherein the receiving is responsive to the request.

* * * * *